US009699742B2

(12) United States Patent
Ko et al.

(10) Patent No.: US 9,699,742 B2
(45) Date of Patent: Jul. 4, 2017

(54) METHOD AND APPARATUS FOR TRANSMITTING AND RECEIVING SIGNALS IN WIRELESS COMMUNICATION SYSTEM

(71) Applicant: LG ELECTRONICS INC., Seoul (KR)

(72) Inventors: Hyunsoo Ko, Anyang-si (KR); Jinmin Kim, Anyang-si (KR); Jaehoon Chung, Anyang-si (KR)

(73) Assignee: LG Electronics Inc., Seoul (KR)

(*) Notice: Subject to any disclaimer, the term of this patent is extended or adjusted under 35 U.S.C. 154(b) by 386 days.

(21) Appl. No.: 14/375,528

(22) PCT Filed: Feb. 18, 2013

(86) PCT No.: PCT/KR2013/001236
§ 371 (c)(1),
(2) Date: Jul. 30, 2014

(87) PCT Pub. No.: WO2013/122433
PCT Pub. Date: Aug. 22, 2013

(65) Prior Publication Data
US 2015/0043406 A1 Feb. 12, 2015

Related U.S. Application Data

(60) Provisional application No. 61/599,950, filed on Feb. 17, 2012.

(51) Int. Cl.
*G08C 17/00* (2006.01)
*H04B 7/185* (2006.01)
(Continued)

(52) U.S. Cl.
CPC ......... *H04W 52/325* (2013.01); *H04W 52/38* (2013.01); *H04L 27/2601* (2013.01); *H04W 52/143* (2013.01)

(58) Field of Classification Search
CPC .................................................. H04W 52/325
See application file for complete search history.

(56) References Cited

U.S. PATENT DOCUMENTS 8,811,285 B2 * 8/2014 Qu .......................... H04L 5/005
370/328
2011/0243079 A1 * 10/2011 Chen ..................... H04B 7/063
370/329

(Continued)

FOREIGN PATENT DOCUMENTS

WO 2011-085191 7/2011
WO 2011-102683 8/2011

OTHER PUBLICATIONS

LG Electronics, "Specification impact of reduced power ABS", R1-113978, 3GPP TSG RAN WG1 Meeting #67, San Francisco, USA, Nov. 14-18, 2011 See pp. 1, 2.

(Continued)

*Primary Examiner* — Gerald Smarth
(74) *Attorney, Agent, or Firm* — Dentons US LLP

(57) ABSTRACT

In a method for a transmission point to transmit a downlink signal to a user equipment in a wireless communication system, the method includes determining transmission power of first resource elements for data transmission of an OFDM symbol which does not include a Cell specific Reference Signal (CRS) and transmission power of second resource elements for data transmission of an OFDM symbol which includes the CRS, wherein a first parameter related to the determination of the transmission power of the first resource elements and a second parameter related to the determination of the transmission power of the second resource elements are determined by one of a first configuration and a second configuration, and wherein the first configuration and the second configuration are selectively applied according to one or more of a subframe and a transmission mode.

12 Claims, 8 Drawing Sheets

(51) Int. Cl.
*H04W 52/32* (2009.01)
*H04W 52/38* (2009.01)
*H04L 27/26* (2006.01)
*H04W 52/14* (2009.01)

(56) References Cited

U.S. PATENT DOCUMENTS

| | | | | |
|---|---|---|---|---|
| 2012/0051451 A1* | 3/2012 | Kwon | ................... | H04L 5/0057 |
| | | | | 375/285 |
| 2012/0076023 A1* | 3/2012 | Ko | ....................... | H04B 7/0486 |
| | | | | 370/252 |
| 2012/0230290 A1* | 9/2012 | Seo | ....................... | H04L 1/0026 |
| | | | | 370/329 |
| 2013/0003788 A1* | 1/2013 | Marinier | ................ | H04B 7/024 |
| | | | | 375/219 |

OTHER PUBLICATIONS

Alcatel-Lucent, Consideration of Signaling Support for Non-Zero Power ABS, R1-120488, 3GPP TSG RAN WG1 Meeting #68, Dresden Germany, Feb. 6-10, 2012 See p. 1.
International Search Report from PCT/KR2013/001236, dated Jun. 27, 2013.
Written Opinion of the ISA from PCT/KR2013/001236, dated Jun. 27, 2013.

* cited by examiner

FIG. 5
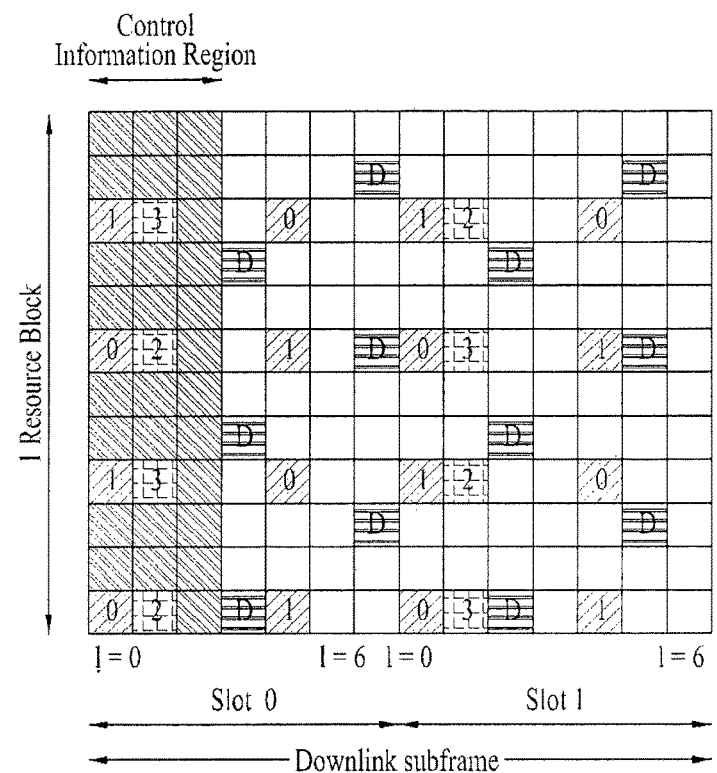
(a)
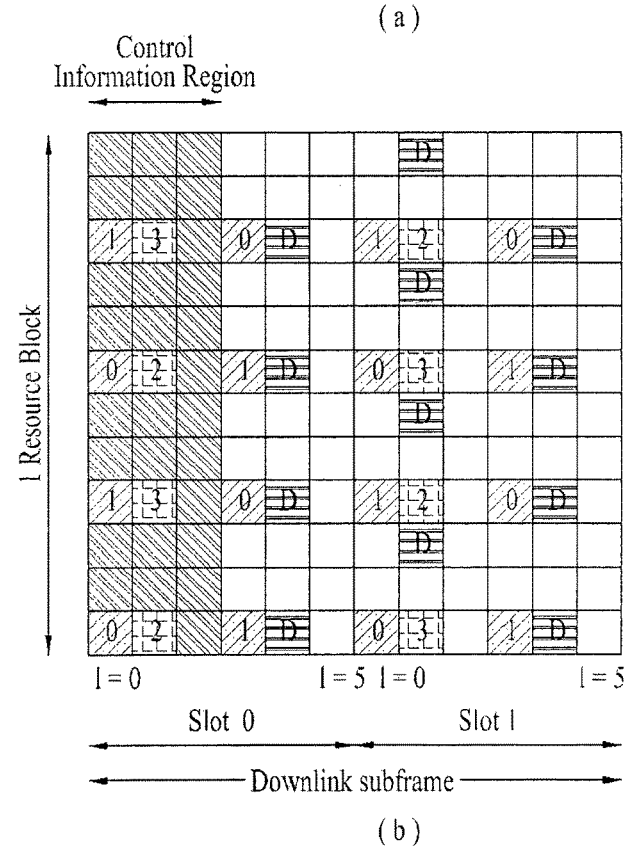
(b)

MeNB : macro eNodeB
PeNB : pico eNodeB
FeNB : femto eNodeB

MUE : macro UE
PUE : pico UE
FUE : femto eNodeB

METHOD AND APPARATUS FOR TRANSMITTING AND RECEIVING SIGNALS IN WIRELESS COMMUNICATION SYSTEM

This application is a 35 USC §371 National Stage entry of International Application No. PCT/KR2013/001236 filed on Feb. 18, 2013, and claims priority to U.S. Provisional Application No. 61/599,950 filed on Feb. 17, 2012, which are hereby incorporated by reference in their entireties as if fully set forth herein.

TECHNICAL FIELD

The present invention relates to a wireless communication system, and more particularly, to a method and apparatus for allocating transmission power of a downlink signal.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmission power, etc.). Multiple access systems include, for example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

DISCLOSURE

Technical Problem

An object of the present invention is to provide techniques for newly defining a transmission power parameter of a downlink signal and selectively applying the power parameter to downlink signal transmission.

It will be appreciated by persons skilled in the art that that the technical objects that can be achieved through the present invention are not limited to what has been particularly described hereinabove and other technical objects of the present invention will be more clearly understood from the following detailed description.

Technical Solution

In a first technical aspect of the present invention, a method for transmitting, at a transmission point, a downlink signal to a user equipment in a wireless communication system includes determining transmission power of first resource elements for data transmission of an OFDM symbol which does not include a Cell specific Reference Signal (CRS) and transmission power of second resource elements for data transmission of an OFDM symbol which includes the CRS, wherein a first parameter related to the determination of the transmission power of the first resource elements and a second parameter related to determination of the transmission power of the second resource elements are determined by one of a first configuration and a second configuration, and wherein the first configuration and the second configuration are selectively applied according to one or more of a subframe and a transmission mode.

In a second technical aspect of the present invention, a method for receiving a downlink signal includes receiving a subframe including first resource elements for data transmission of an OFDM symbol which does not include a Cell specific Reference Signal (CRS) and second resource elements for data transmission of an OFDM symbol which includes the CRS, transmission power of the first resource elements being determined by a first parameter and transmission power of the second resource elements being determined by a second parameter, wherein the first parameter and the second parameter are determined by one of a first configuration and a second configuration, and wherein the first configuration and the second configuration are selectively applied according to one or more of a subframe and a transmission mode.

In a third technical aspect of the present invention, a transmission point in a wireless communication system includes a transmission module and a processor, wherein the processor determines transmission power of first resource elements for data transmission of an OFDM symbol which does not include a Cell specific Reference Signal (CRS) and transmission power of second resource elements for data transmission of an OFDM symbol which includes the CRS, wherein a first parameter related to the determination of the transmission power of the first resource elements and a second parameter related to the determination of the transmission power of the second resource elements are determined by one of a first configuration and a second configuration, and wherein the first configuration and the second configuration are selectively applied according to one or more of a subframe and a transmission mode.

In a fourth technical aspect of the present invention, a user equipment in a wireless communication system includes a reception module and a processor, wherein the processor receives a subframe including first resource elements for data transmission of an OFDM symbol which does not include a Cell specific Reference Signal (CRS) and second resource elements for data transmission of an OFDM symbol which includes the CRS, transmission power of the first resource elements being determined by a first parameter and transmission power of the second resource elements being determined by a second parameter, wherein the first parameter and the second parameter are determined by one of a first configuration and a second configuration, and wherein the first configuration and the second configuration are selectively applied according to one or more of a subframe and a transmission mode.

The above first to fourth technical aspects of the present invention may include the followings all or partially.

The first configuration may be a transmission power parameter configuration for an Almost Blank Subframe (ABS) and the second configuration may be a transmission power parameter configuration for a subframe other than the ABS.

Values for the first parameter according to the first configuration may be a subset of values for the first parameter according to the second configuration.

The values for the first parameter according to the first configuration may have negative values of the values for the first parameter according to the second configuration.

The second parameter according to the first configuration may be a fixed value.

The second parameter according to the first configuration may be equal to the second parameter according to the second configuration.

The first parameter according to the first configuration may be a cell specific parameter and the first parameter according to the second configuration may be a user equipment specific parameter.

Subframes to which the first configuration is applied and subframes to which the second configuration is applied may be transmitted to the user equipment through higher layer signaling.

Which one of the first configuration and the second configuration is applied to a subframe in which the downlink signal is transmitted may be transmitted to the user equipment through L1/L2 signaling.

The L1/L2 signaling may be composed of 1-bit information of a control channel.

The selective application may be performed only in a fallback mode in case of a Demodulation Reference Signal (DMRS) related transmission mode of the transmission mode.

Advantageous Effects

According to the present invention, transmission power of a downlink signal can be dynamically allocated. In addition, throughput can be improved by facilitating use of an ABS of low power through a transmission power related parameter of a newly defined downlink signal.

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 5 is a view referred to for describing reference signals;

BEST MODE

Figure 1:
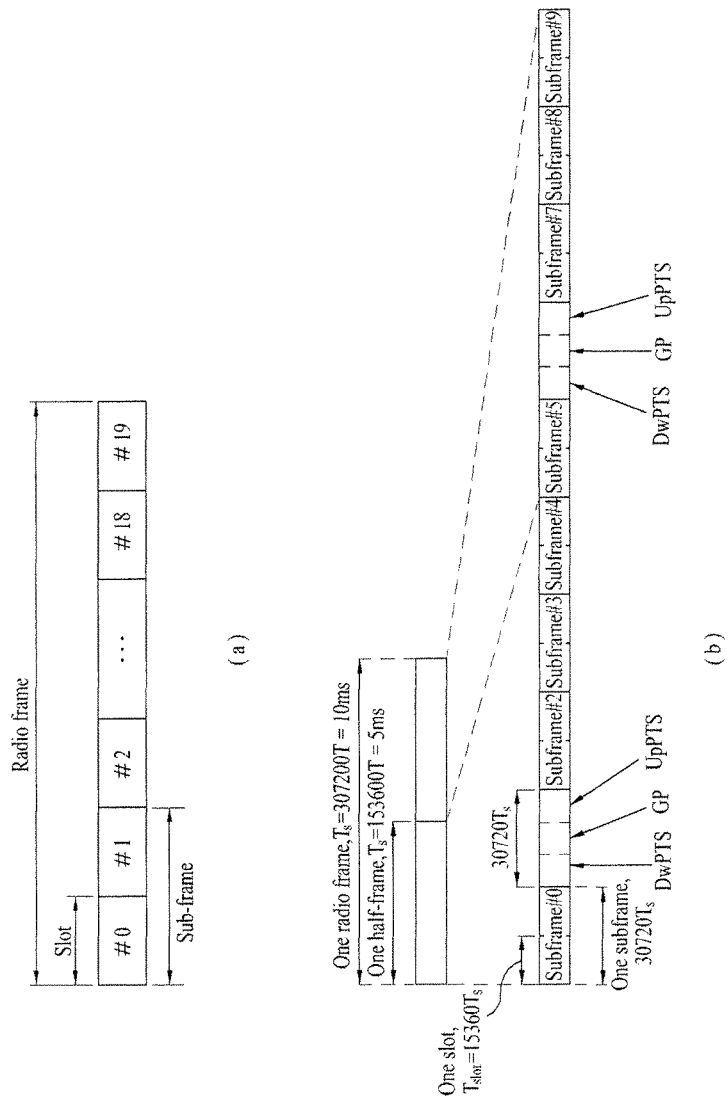
FIG. 1 is a view illustrating the structure of a radio frame.

The embodiments of the present invention described below are combinations of elements and features of the present invention in a predetermined form. The elements or features are considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions or features of another embodiment.

In this specification, a description of embodiments of the present invention is given based on a data transmission and reception relationship between a BS and a terminal. Here, the BS refers to a terminal node of a network which directly communicates with the terminal. In some cases, a specific operation described as being performed by the BS may be performed by an upper node of the BS.

Namely, it is apparent that, in a network comprised of a plurality of network nodes including a BS, various operations performed for communication with a terminal may be performed by the BS, or network nodes other than the BS. The term 'BS' may be replaced with terms such as fixed station, Node B, eNode B (eNB), Access Point (AP), etc. The term 'relay' may be replaced with terms such as Relay Node (RN), Relay Station (RS), etc. The term 'terminal' may be replaced with terms such as User Equipment (UE), Mobile Station (MS), Mobile Subscriber Station (MSS), Subscriber Station (SS), etc.

Specific terms used for the embodiments of the present invention are provided to aid in the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed in at least one of wireless access systems including an Institute of Electrical and Electronic Engineers (IEEE) 802 system, a 3rd Generation Partnership Project (3GPP) system, a 3GPP LTE system, an LTE-Advanced (LTE-A) system, and a 3GPP2 system. Steps or parts that are not described to clarify the technical features of the present invention can be supported by those documents. In addition, all terms as set forth herein can be explained by the above standard documents.

The following techniques may be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as radio technology such as Universal Terrestrial Radio Access (UTRA) or CDMA2000. TDMA may be implemented as radio technology such as Global System for Mobile communications (GSM)/General Packet Radio Service (GPRS)/Enhanced Data Rates for GSM Evolution (EDGE). OFDMA may be implemented as radio technology such as IEEE 802.11 (Wi-Fi), IEEE 802.16 (WiMAX), IEEE 802.20, Evolved-UTRA (E-UTRA), etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolved version of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this disclosure focuses on the 3GPP LTE and 3GPP LTE-A systems. However, the technical features of the present invention are not limited thereto.

The structure of a radio frame will now be described with reference to FIG. 1.

In a cellular Orthogonal Frequency Division Multiplexing (OFDM) wireless packet communication system, uplink and/or downlink data packets are transmitted in units of subframes. One subframe is defined as a predetermined time period including a plurality of OFDM symbols. The 3GPP LTE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes each including two slots in the time domain. A time during which one subframe is transmitted is defined as a Transmission Time Interval (TTI). For example, the length of one subframe may be 1 ms and the length of one slot may be 0.5 ms. One slot includes a plurality of OFDM symbols in the time domain and a plurality of Resource Blocks (RBs) in the frequency domain. Because the 3GPP LTE system adopts OFDMA for downlink, an OFDM symbol represents one symbol duration. An OFDM symbol may be referred to as an SC-FDMA symbol or symbol duration. An RB is a resource allocation unit and may include a plurality of contiguous subcarriers in a slot.

The number of OFDM symbols included in one slot may vary according to a Cyclic Prefix (CP) configuration. There are two types of CPs: extended CP and normal CP. In the case of the normal CP, the number of OFDM symbols included in one slot may be 7. In the case of the extended CP, the length of one OFDM symbol is increased and thus the number of OFDM symbols included in one slot may be, for example, 6, which is smaller than in the case of the normal CP. If a channel state is unstable as in the case where a UE moves at high speed, the extended CP may be used to further decrease interference between symbols.

In the case of the normal CP, one subframe includes 14 OFDM symbols because one slot includes 7 OFDM symbols. The first two or three OFDM symbols of each subframe may be allocated to a Physical Downlink Control Channel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation in a UE. The UpPTS is used for channel estimation and uplink transmission synchronization acquisition of a UE in an eNB. The GP is a period between uplink and downlink, which eliminates uplink interference caused by multipath delay of a downlink signal. One subframe includes two slots irrespective of the type of a radio frame.

The above-described radio frame structures are purely exemplary and thus the number of subframes in a radio frame, the number of slots in a subframe, or the number of symbols in a slot may vary.

Figure 2:
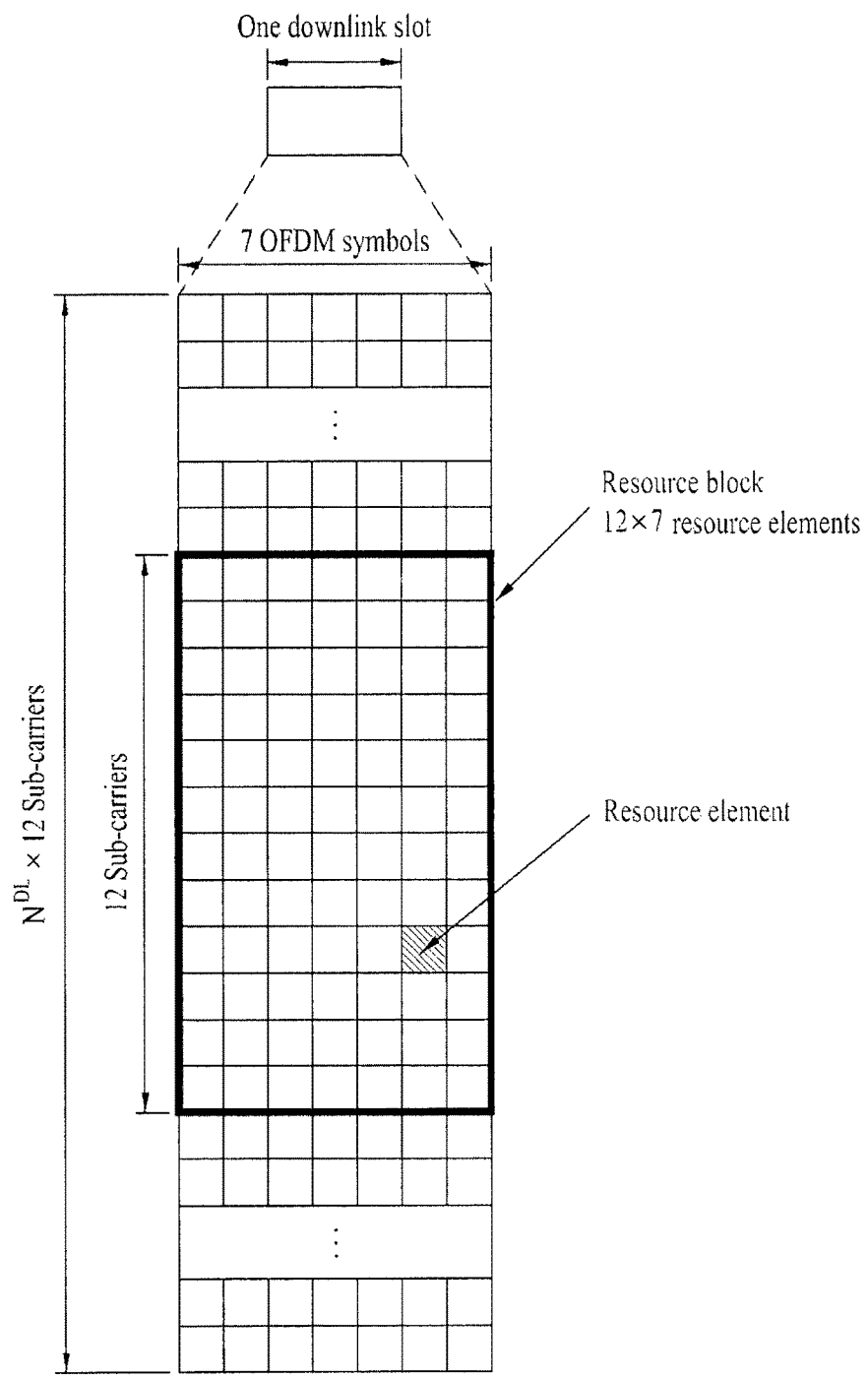
FIG. 2 is a view illustrating a resource grid in a downlink slot.

FIG. 2 illustrates a resource grid in a downlink slot. One downlink slot includes 7 OFDM symbols in the time domain and an RB includes 12 subcarriers in the frequency domain. However, the present invention is not limited thereto. For example, one slot may include 7 OFDM symbols in the case of the normal CP and 6 OFDM symbols in the case of the extended CP. Each element of the resource grid is referred to as a Resource Element (RE). An RB includes 12×7 REs. The number of RBs in a downlink slot, $N^{DL}$, depends on downlink transmission bandwidth. An uplink slot may have the same structure as a downlink slot.

Figure 3:
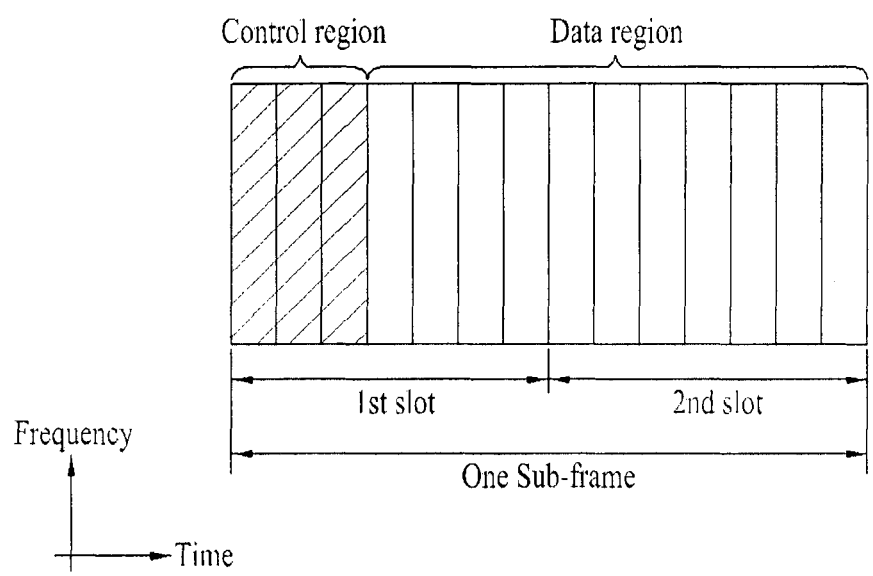
FIG. 3 is a view illustrating the structure of a downlink subframe.

FIG. 3 illustrates the structure of a downlink subframe. A maximum of three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include, for example, a Physical Control Format Indicator Channel (PCFICH), a Physical Downlink Control Channel (PDCCH), and a Physical Hybrid automatic repeat request (HARQ) Indicator Channel (PHICH). The PCFICH is transmitted in the first OFDM symbol of a subframe and includes information about the number of OFDM symbols used for transmission of control channels in the subframe. The PHICH includes HARQ ACKnowledgment/Negative ACKnowledgment (ACK/NACK) signal as a response to uplink transmission. Control information transmitted through the PDCCH is called Downlink Control Information (DCI). The DCI includes uplink or downlink scheduling information, or uplink transmission power control commands for a certain UE group. The PDCCH may include information about resource allocation and a transport format for a Downlink Shared Channel (DL-SCH), resource allocation information about an Uplink Shared Channel (UL-SCH), paging information of a Paging Channel (PCH), system information on the DL-SCH, information about resource allocation for a higher-layer control message such as a random access response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is transmitted as an aggregate of one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a Cyclic Redundancy Check (CRC) to control information. The CRC is masked by an identifier known as a Radio Network Temporary Identifier (RNTI) according to the owner or usage of the PDCCH. If the PDCCH is dedicated to a specific UE, a cell-RNTI (C-RNTI) of the UE may be masked to the CRC. If the PDCCH is dedicated to a paging message, a paging identifier (paging-RNTI (P-RNTI)) may be masked to the CRC. If the PDCCH is for system information (especially, a System Information Block (SIB)), a system information identifier and a System Information RNTI (SI-RNTI) may be masked to the CRC. A Random Access RNTI (RA-RNTI) may be masked to the CRC in order to indicate a random access response to a random access preamble transmitted by a UE.

Figure 4:
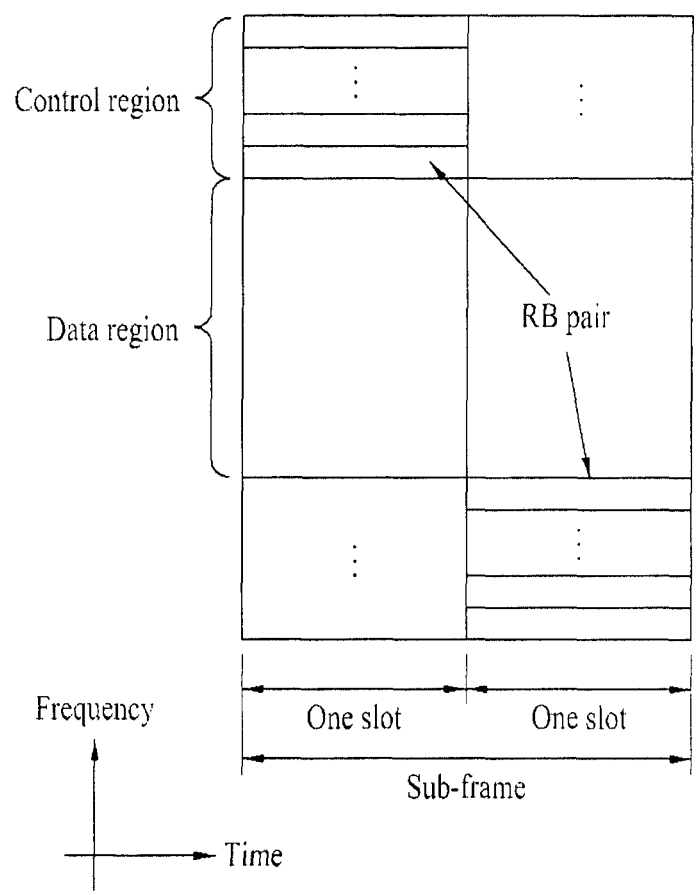
FIG. 4 is a view illustrating the structure of an uplink subframe.

FIG. 4 illustrates the structure of an uplink subframe. An uplink subframe may be divided into a control region and a data region in the frequency domain. A Physical Uplink Control Channel (PUCCH) including uplink control information is allocated to the control region and a Physical Uplink Shared Channel (PUSCH) including user data is allocated to the data region. To maintain a single carrier property, a UE does not transmit a PUSCH and a PUCCH simultaneously. A PUCCH for a UE is allocated to an RB pair in a subframe. The RBs belonging to the RB pair occupy different subcarriers in two slots. Thus it is said that the RB pair allocated to the PUCCH is frequency-hopped over a slot boundary.

Reference Signal (RS)

In a wireless communication system, a packet is transmitted through a radio channel and thus the packet may be distorted during transmission. To receive a signal successfully, a receiver should compensate for distortion of the received signal using channel information. To obtain the channel information, a transmitter transmits a signal known to both the transmitter the receiver and the receiver acquires the channel information based on distortion of the signal received through the radio channel. This signal is called a pilot signal or an RS.

In the case of data transmission and reception using multiple antennas, a channel states between transmit antennas and receive antennas should be discerned in order to correctly receive a signal. Accordingly, an RS should be transmitted through each transmit antenna, in more detail, each antenna port.

RSs may be divided into downlink RSs and uplink RSs. In the current LTE system, the uplink RSs include:

i) Demodulation Reference Signal (DMRS) used for channel estimation for coherent demodulation of information transmitted through a PUSCH and a PUCCH; and ii) Sounding Reference Signal (SRS) used for an eNB or a network to measure the quality of an uplink channel in a different frequency.

The downlink RSs include:

i) Cell-specific Reference Signal (CRS) shared among all UEs in a cell;

ii) UE-specific RS dedicated to a specific UE;

iii) DM-RS used for coherent demodulation when a PDSCH is transmitted;

iv) Channel State Information-Reference Signal (CSI-RS) used for transmitting CSI, when downlink DM-RSs are transmitted;

v) Multimedia Broadcast Single Frequency Network (MBSFN) RS used for coherent demodulation of a signal transmitted in MBSFN mode; and vi) Positioning RS used to estimate geographical position information of a UE.

RSs may be divided into two types according to purposes thereof: RSs for channel information acquisition and RSs for data demodulation. Since the purpose of the former is to cause the UE to acquire downlink channel information, the RSs for channel information acquisition should be transmitted in a broad band and even a UE that does not receive downlink data in a specific subframe should receive the RSs. The RSs for channel information acquisition are also used in a situation such as handover. The RSs for data demodulation are RSs that an eNB transmits along with downlink data in a corresponding resource. A UE can demodulate the data by measuring a channel using the RSs for data demodulation. The RSs for data demodulation should be transmitted in a data transmission area.

The CRS is used for two purposes, that is, channel information acquisition and data demodulation. The UE-specific RS is used only for data demodulation. The CRS is transmitted in every subframe in a broad band and CRSs for up to four antenna ports are transmitted according to the number of transmit antennas of an eNB.

For example, if the number of transmit antennas of an eNB is 2, CRSs for antenna ports 0 and 1 are transmitted. In the case of four transmit antennas, CRSs for antenna ports 0 to 3 are respectively transmitted.

FIG. 5 illustrates patterns in which CRSs and DRSs are mapped to a downlink RB pair, as defined in a legacy 3GPP LTE system (e.g. a Release-8 system). A downlink RB pair as an RS mapping unit may be expressed as one subframe in time by 12 subcarriers in frequency. That is, an RB pair includes 14 OFDM symbols in time in the case of the normal CP (see FIG. 5($a$)) and 12 OFDM symbols in time in the case of the extended CP (see FIG. 5($b$)).

FIG. 5 illustrates the positions of RSs on an RB pair in a system where an eNB supports four transmit antennas. In FIG. 5, REs expressed by reference numerals '0', '1', '2', and '3' illustrates the positions of CRSs for antenna ports 0, 1, 2, and 3, respectively, and REs expressed by 'D' denote the positions of DRSs.

Coordinated Multi-Point (CoMP)

According to enhanced system performance requirements of the 3GPP LTE-A system, CoMP transmission and reception technology (also referred to as co-MIMO, collaborative MIMO, or network MIMO) has been proposed. CoMP can increase the performance of a UE located at a cell edge and increase average sector throughput.

Generally, the performance of a UE located at a cell edge and average sector throughput may be decreased due to Inter-Cell Interference (ICI) in a multi-cellular environment with a frequency reuse factor of 1. To reduce ICI, the legacy LTE system has adopted a simple passive technique such as Fractional Frequency Reuse (FFR) based on UE-specific power control so that a UE located at a cell edge may have appropriate throughput performance in an environment constrained by interference. However, it is desirable to reduce ICI or reuse ICI as a desired signal for the UE, rather than to decrease utilization of frequency resources per cell. For this purpose, a CoMP transmission technique may be adopted.

Downlink CoMP schemes are broadly classified into Joint Processing (JP) and Coordinated Scheduling/Beamforming (CS/CB).

According to the JP scheme, each transmission point (eNB) of a CoMP cooperation unit may use data. The CoMP cooperation unit refers to a set of eNBs used for a CoMP transmission scheme. The JP scheme is further divided into joint transmission and dynamic cell selection.

Joint transmission is a technique of transmitting PDSCHs from a plurality of transmission points (a part or the whole of a CoMP cooperation unit) at one time. That is, a plurality of transmission points may simultaneously transmit data to a single UE. The joint transmission scheme can improve the quality of a received signal coherently or non-coherently and actively eliminate interference with other UEs.

Dynamic cell selection is a technique of transmitting PDSCHs from one transmission point (of a CoMP cooperation unit) at one time. That is, one transmission point transmits data to a single UE at a specific time point, while the other transmission points of the CoMP cooperation unit do not transmit data to the UE at the time point. A transmission point for transmitting data to the UE may be dynamically selected.

Meanwhile, in the CS/CB scheme, CoMP cooperation units may perform cooperative beamforming for data transmission to a single UE. While only a serving cell transmits data to the UE, user scheduling/beamforming may be determined through coordination among cells of the CoMP cooperation unit.

Uplink CoMP reception refers to reception of an uplink signal through cooperation among a plurality of geographically separate transmission points. Uplink CoMP schemes include Joint Reception (JR) and Coordinated Scheduling/Beamforming (CS/CB).

In JR, a plurality of reception points receives a signal transmitted through a PUSCH. In CS/CB, while only one transmission point receives a PUSCH, user scheduling/beamforming is determined through coordination among cells of a CoMP cooperation unit.

In this CoMP system, multi-cell eNBs can commonly support data for a UE. In addition, the eNBs simultaneously support one or more UEs using the same radio frequency resources, thereby increasing system performance. The eNBs may also operate in Space Division Multiple Access (SDMA) based on CSI between a UE and the eNBs.

A serving eNB and one or more cooperative eNBs are connected to a scheduler through a backbone network in the CoMP system. The scheduler may receive channel information about the channel states between a UE and the cooperative eNBs, measured by each cooperative eNB and operate based on the channel information. For example, the scheduler may schedule information for cooperative MIMO for the serving eNB and the one or more cooperative eNBs. That is, the scheduler may directly command each eNB to perform the cooperative MIMO operation.

As described above, a CoMP system operates as a virtual MIMO system by grouping a plurality of cells into one group. Basically, the CoMP system adopts a MIMO communication scheme using multiple antennas.

Heterogeneous Deployment

Figure 6:
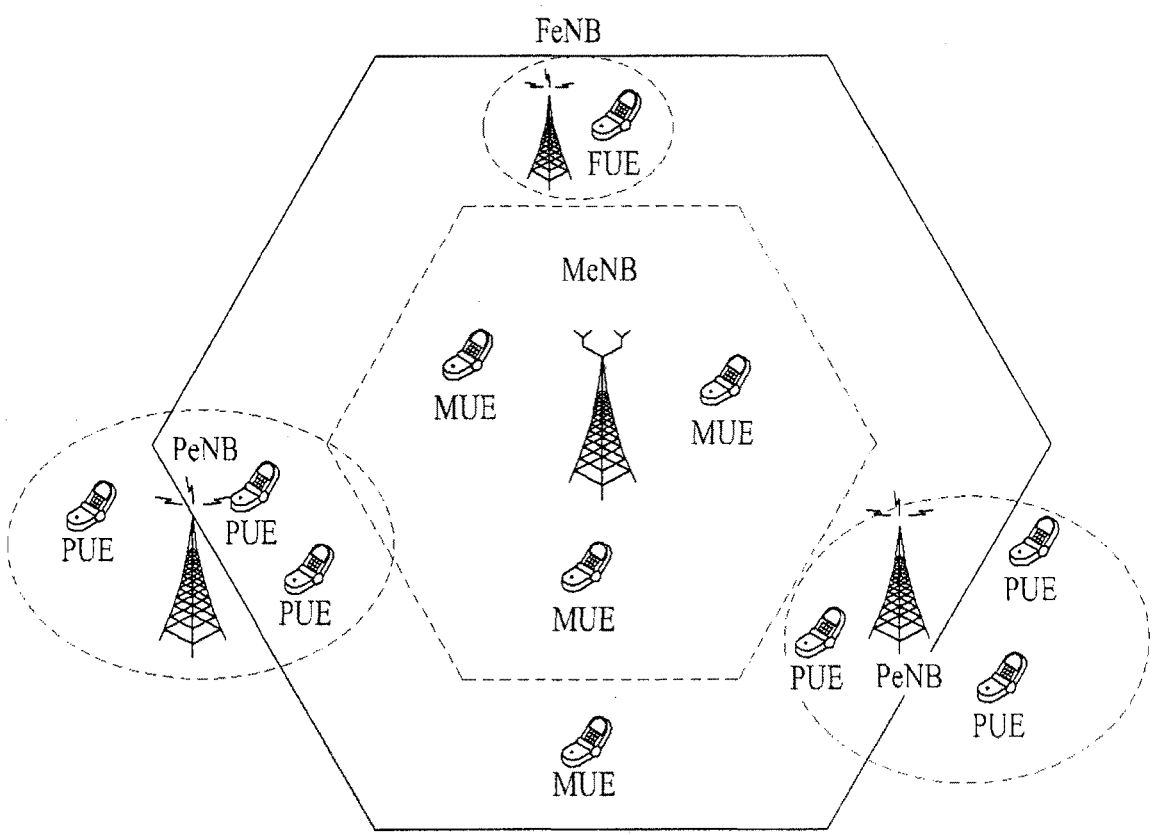
FIG. 6 is a view illustrating a heterogeneous network environment.

FIG. 6 illustrates a heterogeneous network wireless communication system including a macro eNB (MeNB) and a micro eNB (a Pico eNB (PeNB) or a Femto eNB (FeNB)). In this document, the term 'heterogeneous network' refers to a network in which an MeNB coexists with a micro eNB (PeNB or FeNB) even when the same Radio Access Technology (RAT) is used.

The MeNB is a general eNB having broad coverage and high transmission power in a wireless communication system. The MeNB may also be called a macrocell.

The micro eNB (PeNB or FeNB) may also be called, for example, a microcell, a picocell, a femtocell, a Home eNB (HeNB), a relay, etc. (the exemplary micro eNB and MeNB may be collectively referred to as transmission points). The micro eNB (PeNB or FeNB) is a small-sized version of the MeNB and can operate independently while performing most of the functions of the MeNB. The micro eNB (PeNB or FeNB) is overlaid in the coverage area of the MeNB or installed in a shadow area that the MeNB cannot reach. Compared to the MeNB, the micro eNB (PeNB or FeNB) may accommodate a small number of UEs with small coverage and low transmission power.

A UE may be served directly by the MeNB (such a UE is referred to as a Macro UE (MUE)) or by the micro eNB (PeNB or FeNB) (such a UE is referred to as a micro UE (a Pico UE (PUE) or Femto UE (FUE))). In any case, a PUE in the coverage of the PeNB may be served by the MeNB.

The micro eNBs may be classified into two types depending on whether access from a UE is restricted.

The first type is an eNB of an Open access Subscriber Group (OSG) or non-Closed access Subscriber Group (non-CSG), which allows access from an existing MUE or from a micro UE of a micro eNB. The existing MUE etc. may perform handover to an OSG eNB.

The second type is a CSG eNB. The CSG eNB does not allow access from an existing MUE or a micro UE of a micro eNB. Thus, a UE cannot perform handover to a CSG eNB.

Inter-Cell Interference Coordination (ICIC), Enhanced ICIC

In a heterogeneous network environment and/or a CoMP environment, interference between neighbor cells may occur. ICIC may be adopted to solve such an intercell interference problem.

As exemplary ICIC for a frequency resource, the 3GPP LTE Release-8 system defines a scheme for dividing an overall frequency region (e.g. system bandwidth) into one or more sub-regions (e.g. in units of Physical Resource Blocks (PRBs)) and exchanging ICIC messages between cells in individual frequency sub-regions. For example, Relative Narrowband Transmission power (RNTP) related to downlink transmission power, uplink Interference Overhead Indication (IOI) related to uplink interference, and uplink High Interference Indication (HID are defined as information included in the ICIC messages for frequency resources.

RNTP is information indicating downlink transmission power that a cell transmitting an ICIC message uses in a specific frequency sub-region. For example, if an RNTP field for a specific frequency sub-region is set to a first value (for example, 0), this means that downlink transmission power of the corresponding cell does not exceed a predetermined threshold value in the corresponding frequency sub-region. Meanwhile, if the RNTP field for the specific frequency sub-region is set to a second value (for example, 1), this means that the corresponding cell cannot promise downlink transmission power in the corresponding frequency sub-region. In other words, while the RNTP field set to 0 can be regarded as low downlink transmission power of the corresponding cell in the corresponding frequency sub-region, the RNTP field set to 1 cannot be regarded as low downlink transmission power of the corresponding cell in the corresponding frequency sub-region.

Uplink IOI is information indicating the amount of uplink interference that a cell transmitting an ICIC message experiences (or undergoes) in a specific frequency sub-region. For example, if an IOI field for a specific frequency sub-region is set to a value corresponding to the amount of high interference, this means that the corresponding cell experiences high uplink interference in the corresponding frequency sub-region. In the frequency sub-region corresponding to IOI indicating high uplink interference, a cell receiving the ICIC message may schedule a UE that uses low uplink transmission power from among UEs served thereby. Therefore, since UEs perform uplink transmission at low transmission power in the frequency sub-region corresponding to IOI indicating high uplink interference, uplink interference experienced by a neighbor cell (i.e. a cell transmitting the ICIC message) may be reduced.

Uplink HIT indicates the degree of interference (or uplink interference sensitivity) that may be generated in the corresponding frequency sub-region due to uplink transmission in a cell transmitting the ICIC message. For example, if an HII field is set to a first value (e.g. 1) in a specific frequency sub-region, this may mean that the cell transmitting the ICIC message has a possibility of scheduling a UE of high uplink transmission power in the corresponding frequency sub-region. On the other hand, if the HII field is set to a second value (e.g. 0) in a specific frequency sub-region, this may mean that the cell transmitting the ICIC message has a possibility of scheduling a UE of low uplink transmission power in the corresponding frequency sub-region. Meanwhile, a cell receiving the ICIC message schedules a UE first in a frequency sub-region in which HII is set to the second value (e.g. 0) and schedules UEs capable of operating well even under high interference in another frequency sub-region in which HII is set to the first value (e.g. 1), thereby avoiding interference from another cell transmitting the ICIC message.

On the other hand, as exemplary ICIC for a time resource, the 3GPP LTE-A (or 3GPP LTE Release-10) system defines a scheme for dividing an overall time region into one or more sub-regions (e.g. in units of subframes) in the frequency domain and exchanging information indicating silencing or non-silencing between cells in individual time sub-regions. The cell transmitting the ICIC message may transmit information indicating that silencing is performed in a specific subframe to neighbor cells and does not schedule a PDSCH and a PUSCH in the corresponding subframe. On the other hand, the cell receiving the ICIC message may schedule uplink transmission and/or downlink transmission for a UE in a subframe in which silencing is performed in the cell transmitting the ICIC message.

Silencing may refer to an operation through which a specific cell does not perform most of signal transmission (or transmission is performed at no power or low power) on uplink or downlink in a specific subframe. As an example for a silencing operation, a specific cell may configure a specific subframe as a Multicast Broadcast Single Frequency Network (MBSFN) subframe. In a downlink subframe configured as the MBSFN subframe, signals are transmitted only in a control region and no signals are transmitted in a data region. As another example of a silencing operation, a cell generating interference may configure a specific subframe as an Almost Blank Subframe (ABS) or an ABS-with-MBSFN. In a downlink subframe configured as the ABS, only a CRS is transmitted in a control region and a data region and the other control information and data are not transmitted (or transmission only at low power is possible). Notably, downlink channels and downlink signals such as a Physical Broadcast Channel (PBCH), a Primary Synchronous Signal (PSS), and a Secondary Synchronous Signal (SSS) may be transmitted even in the ABS. ABS-with-MBSFN refers to a subframe in which even the CRS of the data region is not transmitted in the above-described ABS. Thus, silencing may be performed on a subframe basis and information indicating whether silencing is performed may be referred to as a silent subframe pattern.

Downlink Power Allocation

Hereinafter, downlink power allocation in an LTE/LTE-A system will be described.

An eNB may determine downlink transmission power per RE. A UE assumes that a specific CRS Energy Per Resource Element (EPRE) is constant in downlink system bandwidth and in all subframes until other CRS power information is received. CRS EPRE may be derived from downlink RS transmission power given by a parameter referenceSignal-Power provided by higher layers. The downlink RS transmission power may be defined as a linear average over power contributions of all REs that carry CRSs within system bandwidth.

Power of REs that carry PDSCHs may be determined by CRS EPRE. The ratios of PDSCH EPRE to CRS EPRE, $\rho_A$ and $\rho_B$, are defined for each OFDM symbol. $\rho_A$ is the ratio of PDSCH EPRE to CRS EPRE in an OFDM symbol without CRSs and $\rho_B$ is the ratio of PDSCH EPRE to CRS EPRE in an OFDM symbol with CRSs.

The UE may discern $\rho_A$ and $\rho_B$ from transmission power related parameters $P_A$ and $P_B$ received through higher layer signaling. More specifically, $\rho_A$ and $P_A$ have relations indicated by Equation 1 and, therefore, the UE may obtain $\rho_A$ from $P_A$ received through signaling.

$$\rho_A = P_A \text{ [dB]}$$

$$\rho_A = \delta_{power\text{-}offset} + P_A \text{ [dB]}$$

$$\rho_A = \delta_{power\text{-}offset} + P_A + 10\log_{10}(2) \text{ [dB]} \qquad \text{[Equation 1]}$$

where $\delta_{power\text{-}offset}$ is 0 for all PDSCH transmission schemes except for Multi-User (MU-MIMO) and $P_A$ is a UE specific parameter provided by higher layers. $P_A$ may be one of the values shown in Table 1.

TABLE 1

| | Value |
|---|---|
| $P_A$ | 3 dB, 2 dB, 1 dB, 0 dB, −1.77 dB, −3 dB, −4.77 dB, −6 dB |

Meanwhile, the relations between $\rho_A$, $\rho_B$, and $P_B$ are given by Table 2. $P_B$ is a cell specific parameter and is transmitted to the UE through higher layer signaling.

TABLE 2

| | $\rho_B/\rho_A$ | |
|---|---|---|
| $P_B$ | Single antenna port | Two and four antenna ports |
| 0 | 1 | 5/4 |
| 1 | 4/5 | 1 |
| 2 | 3/5 | 3/4 |
| 3 | 2/5 | 1/2 |

The UE is able to discern $\rho_B$ through $\rho_A$ calculated by Equation 1 and $P_B$ of Table 2.

Figure 7:
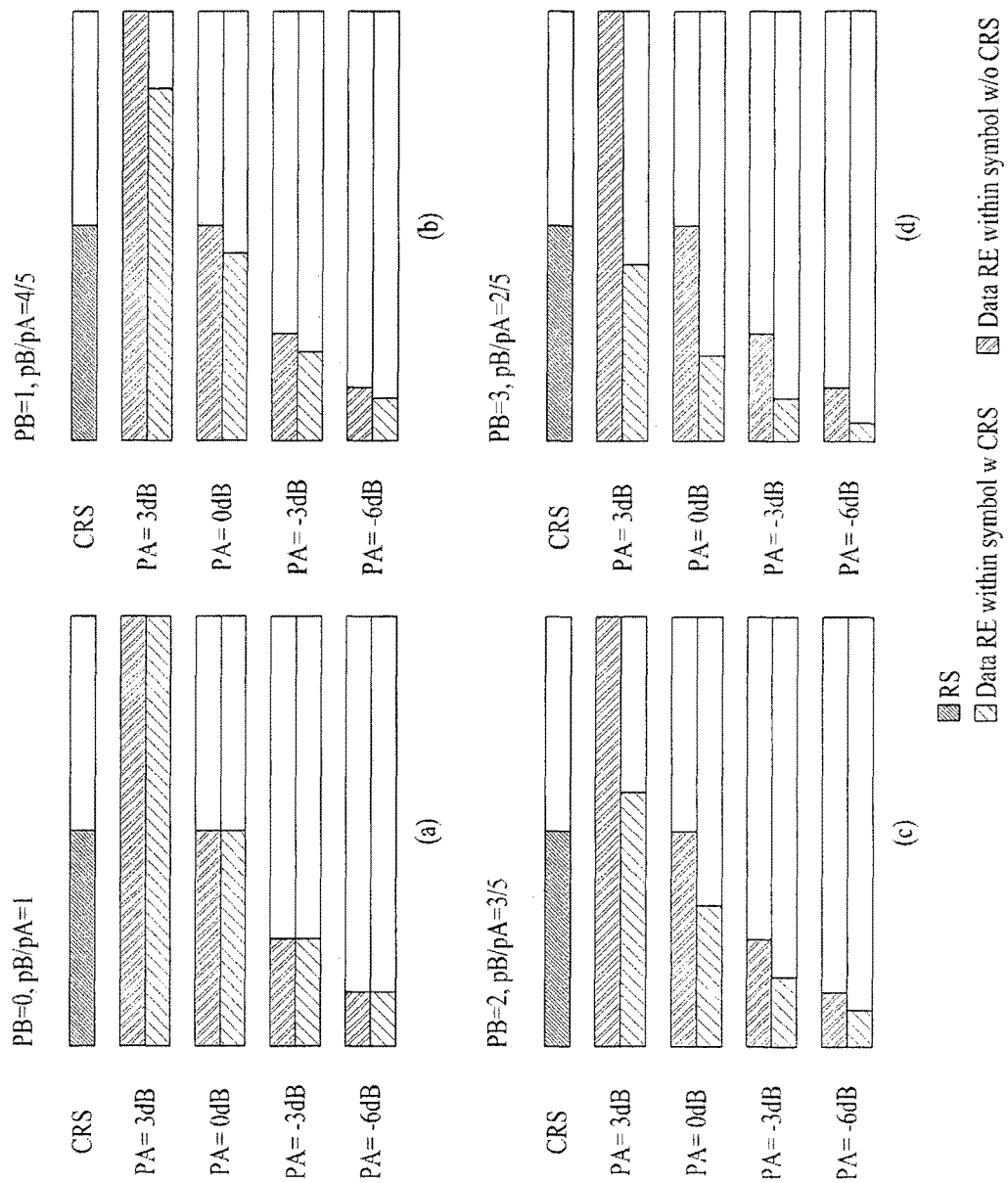
FIG. 7 is a view referred to for describing downlink power allocation.

FIG. 7 is a view provided to aid in the understanding of the above parameters and transmission power. In FIG. 7, the case where $P_A$ is 3, 0, −3, and −6 dB is illustrated on the premise that $\rho_A = P_A$ [dB] under a single antenna port.

Specifically, referring to FIG. 7(a), it can be appreciated that power of twice CRS EPRE is allocated to REs for PDSCH transmission in an OFDM symbol without CRSs. Since $P_B$ is 0, i.e. $\rho_B/\rho_A$ is 1, it can be appreciated that power allocated to REs for PDSCH transmission in an OFDM symbol with CRSs is equal to power allocated to REs for PDSCH transmission in an OFDM symbol without CRSs. If $P_A$ is −3 dB, power corresponding to half of CRS EPRE is allocated to REs for PDSCH transmission in an OFDM symbol without CRSs. Since $P_B$ is 0, it can be appreciated that power allocated to REs for PDSCH transmission in an OFDM symbol with CRSs is equal to power allocated to REs for PDSCH transmission in an OFDM symbol without CRSs.

Referring to FIG. 7(b), since $P_B$ is 1, $\rho_B/\rho_A$ is 4/5. Accordingly, power allocated to REs for PDSCH transmission in an OFDM symbol with CRSs is 4/5 power allocated to REs for PDSCH transmission in an OFDM symbol without CRSs.

It will be understood by those skilled in the art that the other cases are identically applied from the above description.

As can be appreciated from the above description, an energy level of a transmission signal may be expressed by an absolute magnitude value of CRS power and by $\rho_A$ and $\rho_B$ which are energy ratios of REs for CRS RE and PDSCH transmission. That is, an absolute energy ratio of REs for PDSCH transmission is determined by an absolute magnitude value of RS power and by $\rho_A$ and $\rho_B$.

Since $\rho_A$ is determined by $\rho_A$ which is UE-specific information, $\rho_A$ may be UE-specifically defined. Meanwhile, since $\rho_B$ is determined by the product of $P_A$ which is UE-specific information and $P_B$ which is cell-specific information, $\rho_B$ may also be UE-specifically defined. That is, UE-specific downlink power control may be performed using $\rho_A$ and $\rho_B$.

$\rho_A$ and $P_B$ are independent relations and thus energy levels of REs for a PDSCH determined by $\rho_A$ are the same in cells with the same antenna configuration. That is, energy levels in an OFDM symbol without RSs are the same in all cells according to $\rho_A$ under the same antenna configuration and RS power. On the other hand, since $\rho_B$ and $P_B$ are dependent relations, an energy level of data REs determined by $\rho_B$ may be set to have a different energy level per cell.

As described above, $P_A$ and $P_B$ are transmitted through higher layer (RRC) signaling, it is difficult to dynamically control transmission power. In addition, if data is transmitted at weak transmission power other than 0 for the purpose of throughput improvement etc. in an ABS, it is necessary that the ABS and a UE know the transmission power level.

Hereinafter, new parameters $P'_A$ and $P'_B$ are defined based on the downlink transmission power parameters $P_A$ and $P_B$ and application examples thereof will be described.

In the following description, the contents of $P'_A$ and $P'_B$ are referred to as a first configuration in order to distinguish them from the contents of Table 1 and Table 2 for determining the above $P_A$ and $P_B$ in the LTE/LTE-A system. In other words, the contents of Table 1 and Table 2 for determining $P_A$ and $P_B$ are referred to as a second configuration. $P'_A$ and $P'_B$ may be referred to as a first parameter according to the first configuration and a second parameter according to the first configuration, respectively. $P_A$ and $P_B$ may be referred to as a first parameter according to the second configuration and a second parameter according to the second configuration, respectively.

Definition of $P'_A$ and $P'_B$ (Definition of First Configuration)

$P'_A$ may be defined as having power lower than a CRS and $P'_B$ may be defined as having only a specific fixed value.

For example, $P'_A$ may be one of values listed in Table 3 and $P'_B$ may have only a specific fixed value.

TABLE 3

| | Value |
|---|---|
| $P'_A$ | −1.77 dB, −3 dB, −4.77 dB, −6 dB |

2 bits may be required to signal $P'_A$ among the values in Table 3.

Alternatively, $P'_A$ may be one of the values listed in Table 4 and $P'_B$ may have only a specific fixed value.

TABLE 4

| | Value |
|---|---|
| $P'_A$ | −4.77 dB, −6 dB |

Only one bit may be required to signal $P'_A$ among the values in Table 4.

The values shown in Table 3 and Table 4 are a subset of the values listed in Table 1 for the first parameter of the second configuration and are composed of only negative values. This means that the first configuration may be used in an ABS having low transmission power.

Although $P'_B$ has been defined as having a specific fixed value in the above description, $P'_A$ may be defined as having power lower than RS power and $P'_B$ may reuse $P_B$ of the second configuration. In other words, $P'_A$ may conform to the above Table 3 or Table 4 and simultaneously $P'_B$ may conform to the above Table 2.

As another example, $P'_A$ may be defined as a cell-specific parameter in comparison with $P_A$ defined as the UE-specific parameter. In this case, $P'_A$ may be defined as having power lower than the RS power as described in the above example and may be, for example, one of the values listed in Table 3 or Table 4. Alternatively, $P'_A$ may be defined as a fixed value such as −6 dB. At this time, signaling overhead will be reduced to some degree because it is unnecessary to signal $P'_A$.

Application of $P'_A$ and $P'_B$ $P'_A$ and $P'_B$ may be applied to an ABS of low power as described above. Namely, $P'_A$ and P'B may be applied to subframes configured as an ABS and $P_A$ and $P_B$ may be applied to subframes which do not correspond to the ABS.

More generally, subframes may be divided into subframes to which $P'_A$ and $P'_B$ are applied and subframes to which $P_A$ and $P_B$ are applied.

Notably, information as to which one of ($P'_A$ and $P'_B$) and ($P_A$ and $P_B$) is applied needs to be signaled.

Signaling Method of Application or Non-Application of $P'_A$ and $P'_B$

Whether the first and second parameters of the first configuration are applied or the first and second parameters of the second configuration are applied may be indicated through higher layer signaling. To this end, subframes to which the first configuration is applied may be indicated through higher layer signaling.

Through L1/L2 signaling, whether a new power level of the first configuration is to be applied or the existing power level of the second configuration is to be applied may be indicated.

To this end, one signaling bit or combination of the predefined signaling bits may be used and this may be defined as a flag to select one of a predefined power level and a newly defined power level out of power levels indicated through RRC signaling.

Alternatively, the first or second parameter of the first configuration is applied or the first or second parameter of the second configuration is applied may be indicated through L1/L2 signaling.

Relations Between $P'_A$ and $P'_B$ and Transmission Mode $P'_A$ and $P'_B$ may be selectively applied according to transmission mode. That is, a newly defined power level may be applied according to transmission mode or transmission scheme.

For example, a DCI format for a transmission scheme based on a CRS may be defined. More specifically, a transmission scheme using a single antenna port of port 0 is applied to transmission mode 1 and, to this end, DCI formats 1A and 1 are defined. Port 0 is a port of the CRS. In single antenna port transmission based on the CRS, the ratio of power of CRSs and power of REs for PDSCH transmission is important information for demodulation. In this case, it is necessary to indicate whether a newly defined power level is applied.

Tables 5 and 6 shown below indicate whether the new power level is applied in a C-RNTI related transmission mode and in an SPS C-RNTI related transmission mode, respectively.

TABLE 5

| Transmission mode | DCI format | Transmission scheme of PDSCH | Application of other power ratio |
|---|---|---|---|
| Mode 1 | DCI format 1A | Single antenna port, port 0 | o |
|  | DCI format 1 | Single antenna port, port 0 | o |
| Mode 2 | DCI format 1A | Transmit diversity | o |
|  | DCI format 1 | Transmit diversity | o |
| Mode 3 | DCI format 1A | Transmit diversity | o |
|  | DCI format 2A | Large delay CDD or TxD | o |
| Mode 4 | DCI format 1A | Transmit diversity | o |
|  | DCI format 2 | Closed-loop spatial multiplexing | o |
| Mode 5 | DCI format 1A | Transmit diversity | o |
|  | DCI format 1D | Multi-user MIMO | o |
| Mode 6 | DCI format 1A | Transmit diversity | o |
|  | DCI format 1B | Closed-loop spatial multiplexing using a single transmission layer | o |
| Mode 7 | DCI format 1A | Single antenna port, port 0 Transmit diversity | o |
|  | DCI format 1 | Single antenna port, port 5 | x |
| Mode 8 | DCI format 1A | Single antenna port, port 0 Transmit diversity | o |
|  | DCI format 2B | Dual layer transmission, port 7 and 8 Single antenna port, port 7 or 8 | x |
| Mode 9 | DCI format 1A | Single antenna port, port 0 Transmit diversity | o |
|  | DCI format 2C | Up to 8 layer transmission, ports 7-14 | x |

TABLE 6

| Transmission mode | DCI format | Transmission scheme of PDSCH | Application of other power ratio |
|---|---|---|---|
| Mode 1 | DCI format 1A | Single antenna port, port 0 | o |
|  | DCI format 1 | Single antenna port, port 0 | o |
| Mode 2 | DCI format 1A | Transmit diversity | o |
|  | DCI format 1 | Transmit diversity | o |
| Mode 3 | DCI format 1A | Transmit diversity | o |
|  | DCI format 2A | Transmit diversity | o |
| Mode 4 | DCI format 1A | Transmit diversity | o |
|  | DCI format 2 | Transmit diversity | o |
| Mode 5 | DCI format 1A | Transmit diversity | o |
| Mode 6 | DCI format 1A | Transmit diversity | o |
| Mode 7 | DCI format 1A | Single antenna port, port 0 Transmit diversity | o |
|  | DCI format 1 | Single antenna port, port 5 | x |
| Mode 8 | DCI format 1A | Single antenna port, port 0 Transmit diversity | o |
|  | DCI format 2B | Single antenna port, port 7 or 8 | x |
| Mode 9 | DCI format 1A | Single antenna port, port 0 Transmit diversity | o |
|  | DCI format 2C | Single antenna port, port 7 or 8 | x |

As shown in Table 5 and Table 6, the new power level may not be applied to a transmission scheme and DCI format, based on a UE specific RS, i.e. a DMRS. In the other transmission schemes and DCI formats, a signaling bit or an indication method that indicates whether the new power level is applied may be defined.

Figure 8:
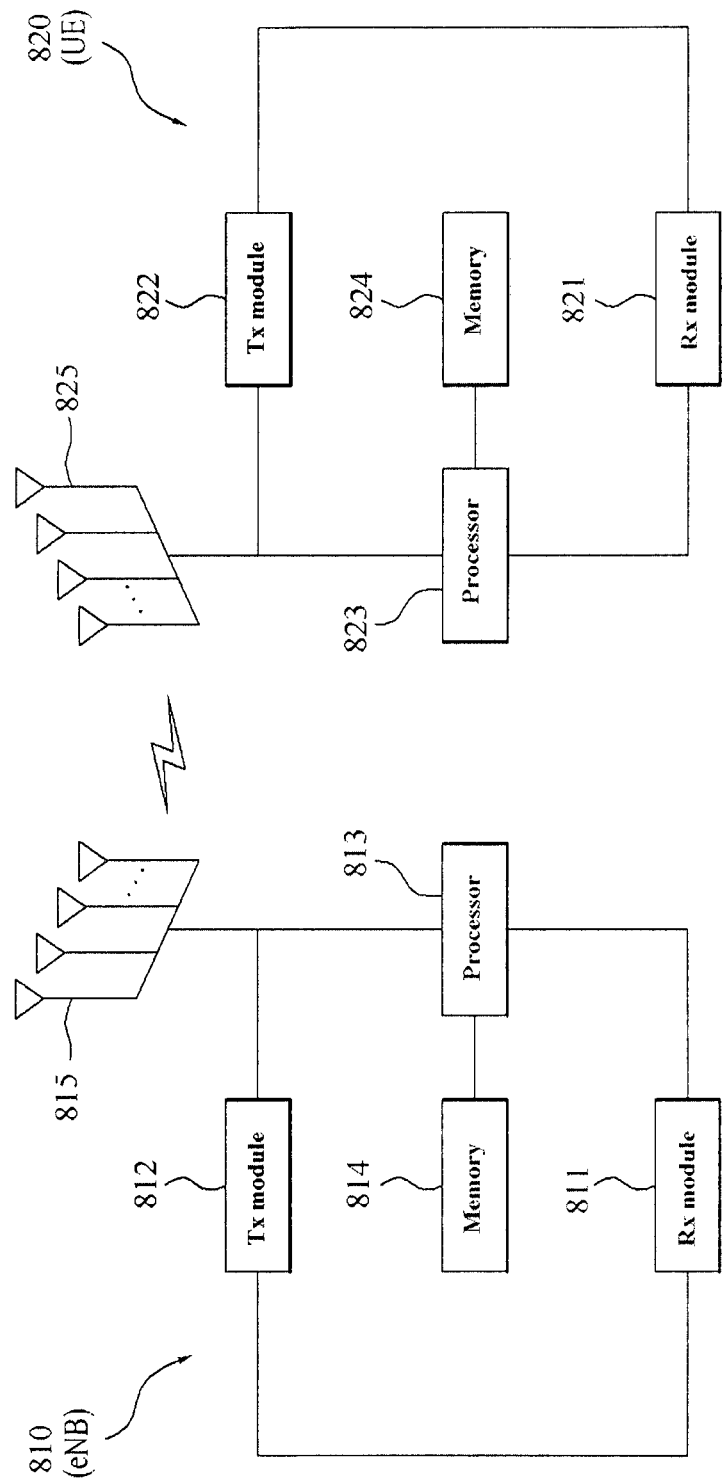
FIG. 8 is a view illustrating the configuration of a transmission apparatus and a reception apparatus.

FIG. 8 is a view illustrating the configuration of a transmission point and a UE according to an embodiment of the present invention.

Referring to FIG. 8, a transmission point 810 according to the present invention may include a reception module 811, a transmission module 812, a processor 813, a memory 814, and a plurality of antennas 815. The plurality of antennas 815 is used to support MIMO transmission and reception. The reception module 811 may receive uplink signals, data and information from a UE. The transmission module 812 may transmit downlink signals, data and information to the UE. The processor 813 may control overall operation of the transmission point 810.

In accordance with an embodiment of the present invention, the processor 813 of the transmission point 810 may perform operations necessary for applying the afore-described embodiments.

The processor 813 of the transmission point 810 processes information received by the transmission point 1110 and information to be transmitted by the transmission point 1110. The memory 814 may store the processed information for a predetermined time and may be replaced with a component such as a buffer (not shown).

Referring back to FIG. 8, a UE 820 according to the present invention may include a reception module 821, a transmission module 822, a processor 823, a memory 824, and a plurality of antennas 825. The plurality of antennas 825 is used to support MIMO transmission and reception. The reception module 821 may receive downlink signals, data and information from the transmission point. The transmission module 822 may transmit uplink signals, data and information to the transmission point. The processor 823 may control overall operation of the UE 820.

In accordance with an embodiment of the present invention, the processor 1123 of the UE 820 may process operations necessary for the afore-described embodiments.

The processor 823 of the UE 820 processes information received by the UE 820 and information to be transmitted by the UE 1120. The memory 824 may store the processed information for a predetermined time and may be replaced with a component such as a buffer (not shown).

One or more of the above-described embodiments of the present invention may be applied to the configurations of the transmission point and the UE, independently or in combination. Repetitive descriptions are avoided for clarity.

In FIG. 8, the description of the transmission point 810 may apply to a relay as a downlink transmission entity or an uplink reception entity and the description of the UE 820 may apply to the relay as a downlink reception entity or an uplink transmission entity.

The embodiments of the present invention are applicable to various mobile communication systems.

The embodiments of the present invention may be achieved by various means, for example, hardware, firmware, software, or a combination thereof. In a hardware configuration, an embodiment of the present invention may be achieved by one or more ASICs (application specific integrated circuits), DSPs (digital signal processors), DSDPs (digital signal processing devices), PLDs (programmable logic devices), FPGAs (field programmable gate arrays), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the preferred embodiments of the present invention has been given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. Therefore, the present invention is not intended to be limited to the embodiments disclosed herein but is to be accorded the broadest scope consistent with the principles and new features disclosed herein.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Therefore, the present invention is not intended to be limited to the embodiments disclosed herein but is to be accorded the broadest scope consistent with the principles and new features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for transmitting, at a transmission point, a downlink signal to a user equipment in a wireless communication system, the method comprising:
   determining transmission power of first resource elements for data transmission of an OFDM symbol which does not include a Cell specific Reference Signal (CRS) and transmission power of second resource elements for data transmission of an OFDM symbol which includes the CRS,
   wherein a first parameter related to the determination of the transmission power of the first resource elements and a second parameter related to the determination of the transmission power of the second resource elements are determined by one of a first configuration and a second configuration, and
   wherein the first configuration and the second configuration are selectively applied to a subframe in which the downlink signal is transmitted according to L1/L2 signaling composed of 1-bit information of a control channel.

2. The method according to claim 1, wherein the first configuration is a transmission power parameter configuration for an Almost Blank Subframe (ABS) and the second configuration is a transmission power parameter configuration for a subframe other than the ABS.

3. The method according to claim 2, wherein values for the first parameter according to the first configuration are a subset of values for the first parameter according to the second configuration.

4. The method according to claim 3, wherein the values for the first parameter according to the first configuration have negative values of the values for the first parameter according to the second configuration.

5. The method according to claim 2, wherein the second parameter according to the first configuration has a fixed value.

6. The method according to claim 2, wherein the second parameter according to the first configuration is equal to the second parameter according to the second configuration.

7. The method according to claim 2, wherein the first parameter according to the first configuration is a cell specific parameter and the first parameter according to the second configuration is a user equipment specific parameter.

8. The method according to claim 1, wherein subframes to which the first configuration is applied and subframes to which the second configuration is applied are transmitted to the user equipment through higher layer signaling.

9. The method according to claim 1, wherein a selective application is performed only in a fallback mode in case of a Demodulation Reference Signal (DMRS) related transmission mode of the transmission mode.

10. A method for receiving a downlink signal, the method comprising:
    receiving a subframe including first resource elements for data transmission of an OFDM symbol which does not include a Cell specific Reference Signal (CRS) and second resource elements for data transmission of an OFDM symbol which includes the CRS, transmission power of the first resource elements being determined by a first parameter and transmission power of the second resource elements being determined by a second parameter,
    wherein the first parameter and the second parameter are determined by one of a first configuration and a second configuration, and
    wherein the first configuration and the second configuration are selectively applied to a subframe in which the downlink signal is transmitted according to L1/L2 signaling composed of 1-bit information of a control channel.

11. A transmission point in a wireless communication system, the transmission point comprising:
    a transmission module; and
    a processor that:
    determines transmission power of first resource elements for data transmission of an OFDM symbol which does not include a Cell specific Reference Signal (CRS) and transmission power of second resource elements for data transmission of an OFDM symbol which includes the CRS,
    wherein a first parameter related to the determination of the transmission power of the first resource elements and a second parameter related to the determination of the transmission power of the second resource elements are determined by one of a first configuration and a second configuration, and
    wherein the first configuration and the second configuration are selectively applied to a subframe in which the downlink signal is transmitted according to L1/L2 signaling composed of 1-bit information of a control channel.

12. A user equipment in a wireless communication system, the user equipment comprising:
a reception module; and
a processor that:
controls the reception module to receive a subframe including first resource elements for data transmission of an OFDM symbol which does not include a Cell specific Reference Signal (CRS) and second resource elements for data transmission of an OFDM symbol which includes the CRS, transmission power of the first resource elements being determined by a first parameter and transmission power of the second resource elements being determined by a second parameter,
wherein the first parameter and the second parameter are determined by one of a first configuration and a second configuration, and
wherein the first configuration and the second configuration are selectively applied to a subframe in which the downlink signal is transmitted according to L1/L2 signaling composed of 1-bit information of a control channel.

* * * * *